Oct. 14, 1958

J. E. JACOBS 2,856,541

SEMICONDUCTING DEVICE

Original Filed Feb. 6, 1952

INVENTOR:—
JOHN E. JACOBS
BY:—
Junius F. Cook, Jr.
ATT'Y

United States Patent Office 2,856,541
Patented Oct. 14, 1958

2,856,541

SEMICONDUCTING DEVICE

John E. Jacobs, Milwaukee, Wis., assignor to General Electric Company, a corporation of New York Original application February 6, 1952, Serial No. 270,235. Divided and this application April 23, 1953, Serial No. 350,553

9 Claims. (Cl. 250—211)

The present invention relates in general to photosensitive semi-conductors, and has more particular reference to semi-conductors particularly well suited for X-ray detection purposes, the invention pertaining specifically to photoconductive material disposed in relatively thin layers of substantial area. The invention comprises subject matter divided from a copending application for United States Letters Patent, Serial No. 270,235, filed February 6, 1952.

Light, broadly speaking, comprises energy emanations or rays of vibratory character having wave lengths within the range of the light spectrum, including visible light rays as well as rays of invisible character, such as ultraviolet and infrared rays, X-rays, gamma rays, electromagnetic waves, and other rays of vibratory character including rays comprising alpha and beta particles and electrons. These various ray categories within the total light spectrum are commonly identified by the characteristic vibratory frequency or wave length range thereof.

For the purpose of the present disclosure, a photosensitive semi-conductor may be defined as a material having electrical resistance, or reactance, or both, which vary in accordance with the intensity of rays to which the substance is exposed, a particular semi-conductor usually being usefully responsive only to rays within a limited wave length range, characteristic of the material, and being relatively or entirely non-responsive to rays of wave length outside of the characteristic response range of the material.

Electrical resistance and reactance, either inductive or capacity reactance, or both, are those characteristics of electrical conductors which tend to prevent or impede the flow of electrical current therethrough under the influence of an electromotive force. The combined flow resistive effect of resistance and reactance, in a given conductor material, is commonly referred to as the electrical impedance of the material.

In the absence of rays to which it is responsive, a semi-conductor may have impedance characteristics of such high order as to constitute the material as a virtual insulator capable of substantially preventing the flow of electrical current therethrough. When irradiated with rays to which it is responsive, the impedance of the semi-conductor material may be reduced as a proportional function of incident ray intensity, so that the material becomes electrically conducting in proportion to the intensity of exciting rays impinging thereon. As a consequence, such ray induced or controlled change in the impedance of the semi-conductor may be measured to indicate and thus detect the presence of a ray impinging on the semi-conductor. The impedance of the semi-conductor, of course, may be determined by applying a known voltage to the semi-conductor and measuring the resultant current flow through the semi-conductor. Measurement of such current flow determines the impedance of the semi-conductor and hence measures the intensity of the impinging ray. Such current flow, alternately, may be employed to operate or to control the operation of any device desired to be made to function in response to the existence of the ray or to changes in the intensity thereof.

The normal impedance of a semi-conductor, in the absence of exciting rays, while of high order, may permit minimum amounts of electrical current to flow in the material, in response to the application of an electrical potential across the semi-conductor. The current which thus may flow in the semi-conductor in the absence of exciting rays may be termed the "dark current" characteristic of the material.

The ability of a semi-conductor thus to alter its impedance in response to the intensity of incident rays may be employed for many useful purposes, by connecting the semi-conductor in suitable electrical translation systems designed to perform, or to control the performance of, desired work operations, in response to ray induced changes in the impedance of the so-connected semi-conductor element.

Perhaps the most widely known semi-conductors are those which are particularly responsive to visible light, or to invisible rays, such as infrared and ultraviolet rays having wave length in the light spectrum immediately adjacent to that of visible light, such semi-conductors being virtual insulators except when exposed to light rays in the visible portions of the spectrum and in the adjacent infrared and ultraviolet spectral regions. These commonly known semi-conductors, however, are not sufficiently responsive to X-rays to allow the useful application thereof to X-ray detecting purposes.

The characteristics of electrically semi-conductive crystalline material, such as the sulphides of cadmium and mercury and the selenide of cadmium, and the manner of applying the same, for the effective detection of X-rays, is taught in copending applications for United States Letters Patent, Serial No. 190,801 of October 18, 1950; Serial No. 228,333 of May 25, 1951, and Serial No. 232,073 of June 18, 1951; and the present invention comprises an elaboration and extension of the teachings set forth in the aforesaid copending applications through the provision of X-ray sensitive crystalline semi-conductor material in the form of relatively thin layers of substantial area, whereby to facilitate X-ray detection at each integral portion of an extended area as distinguished from ray detection within a closely restricted zone or station, as defined by the area of a single detecting crystal, within an X-ray beam of greater sectional size.

An X-ray sensitive layer of the sort herein contemplated may be employed as an X-ray sensitive image orthicon, thus making possible numerous improvements in the practice of X-ray fluoroscopy. The sensitive layers of the present invention further allow for the use of X-rays in the accurate determination of the proper contours for inserts required to be placed or enveloped in optically opaque objects. The sensitive layers may also be employed to advantage in X-ray phototiming, by employing properly placed sensitive layers in various spaced positions within the X-ray beam to be timed, thus eliminating the numerous optical problems presently encountered in conventional phototiming procedures and apparatus. X-ray sensitive layers of the present invention, further, make possible the building of highly sensitive health survey instruments consisting simply of a sensitive film made in accordance with the teachings of the present invention, an electrical power source such as an electrical battery, and a meter. The sensitive layers of the present invention may also be employed for the purpose of X-ray image intensification and for xerographic purposes; and they afford a practical and inexpensive solution to the problem of obtaining efficient performance in the detection of high voltage X-radiation heretofore limited by the size of individual crystals obtainable for use in high voltage X-ray detection.

An important object of the present invention is to provide relatively thin films or layers of crystalline semiconductor material; a further object being to provide layers of such material having substantially uniform thickness whereby each layer is substantially uniformly responsive to exciting rays throughout the entire area of the layer.

Another important object is to provide for coating a face or the opposed faces of the layer with a sheet or film of electrical conducting material, in intimate electrical contact with the material of the layer throughout the surface area thereof.

Another important object is to provide an X-ray sensitive panel or plate comprising stacked layers of X-ray sensitive crystalline semi-conductor material with sheets or films of electrical conducting material disposed between and in superficial electrical contact with each adjacent pair of said layers of semi-conductor material; a further object being to electrically interconnect alternate electrical conducting layers, whereby to dispose the layers of semi-conductor material electrically in parallel relationship.

Another important object is to provide a layer of X-ray sensitive crystalline material by pulverizing crystals of the material to a desired degree of fineness, mixing the pulverized material with a sufficient quantity of a suitable liquid carrier and binder, such as lacquer, to provide a free flowing mixture, applying the mixture upon a backing plate, allowing the so-applied layer to dry out thoroughly, at normal atmospheric temperature, thereafter heating the layer in vacuo to boil off the remaining evaporable components of the binder to provide a layer of pulverized crystalline material of the order of 0.015 inch in thickness adhered upon the metal film or plate.

Another important object is to provide an X-ray detecting panel by first pulverizing X-ray sensitive crystalline material to a desired degree of fineness, mixing the pulverized material with a suitable liquid carrier and binder, such as lacquer, and applying the mixture as a thin layer on a suitable support plate, embodying a sheet of electrical conducting material, allowing the so-applied layer to dry thoroughly in air and then heating the same in vacuo to eliminate the then remaining evaporable components of the binder, and finally applying a thin film of electrical conducting material upon the residual layer of X-ray sensitive crystalline material.

Another important object is to provide an X-ray detecting panel by first flashing or spraying a thin-film of a suitable electrical conducting metal upon a suitable backing plate of electrical insulating material such as silica or quartz glass, pulverizing X-ray sensitive crystalline material to a desired degree of fineness, mixing the pulverized material with a suitable liquid carrier and binder, such as lacquer, and applying the mixture as a thin layer upon said plate mounted film, allowing the so-applied layer to dry thoroughly in air and then heating the same in vacuo to eliminate the then remaining evaporable components of the binder, and finally applying a thin film of electrical conducting material upon the residual layer of X-ray sensitive crystalline material.

A further object is to provide for building up a ray detection panel of desired thickness by successively depositing layers of pulverized crystalline material and of electrical conducting material one upon the other.

The foregoing and numerous other objects, advantages and inherent functions of the invention will become apparent as the same is more fully understood from the following description which, taken in conjunction with the accompanying drawing, discloses a preferred embodiment of the invention for the purpose of demonstrating the same.

Referring to the drawings.

Figure 1:
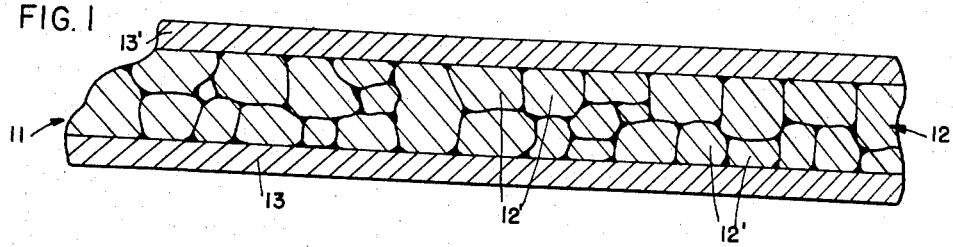
Fig. 1 is a large scale sectional view through an X-ray detecting element made in accordance with the teachings of the present invention and comprising a film or layer of crystalline semi-conductive material, in finely divided granular condition.

To illustrate the invention, the drawings show X-ray sensitive elements 11 comprising layers 12 having appreciable area and formed of X-ray sensitive semi-conductor material, such as crystalline cadmium sulphide, mercury sulphide, or cadmium selenide, in finely divided condition.

Semi-conductors operate as such through the release of electrons entrapped in the material, such electron release being accomplished as the result of ray impingement on the material. Commonly known semi-conductors, such as selenium, operate to release electrons in direct proportion to the alteration of the electrical space charge of the substance, as the result of light impingement thereon, and hence do not show amplification characteristics. Cadmium and mercury sulphides and cadmium selenide, however, when exposed to X-rays, operate by releasing many thousands or hundreds of thousands of electrons in response to unit alteration of the space charge therein, thus showing amplification characteristics not found in ordinary semi-conductors, such as selenium. In that connection, each crystal of a conductor having amplification characteristics operates in fashion comparable to the operation of an electron amplifying tube device.

It is thought that the amplifying character of the crystals is due to the fact that the sulphides of cadmium and mercury and cadmium selenide comprise what may be termed excess electron or electron donor type semi-conductor materials, wherein the excess energy necessary to produce the amplified current in the crystal is derived from the electron producing character of the material itself when irradiated or triggered by exposure to X-rays. It is thought that electron donor centers in each crystal are ionized by the exciting ray, thus forming stationary positive space charges.

This phenomenon can be compared to a conventional electron flow triode tube, wherein the grid is assumed to be floating. In such a tube, the grid takes a negative charge from the electron stream flowing in the tube, thus reducing the plate current to a small value. However, if the grid be charged positively, the current flowing in the tube will increase. In the crystal material, the conduction electrons are, to a large extent, localized in traps, thus forming the current reducing stationary negative space charge. When an exciting ray impinges on the crystal, the electron donor centers are ionized, thus assuming positive charges. The stationary positive charges thus created in the crystal are thought to act in the same way as does a positive charge applied on the grid of a triode tube. One positive hole or station, so created in the crystal, appears to control the flow of more than ten thousand electrons in the crystal. This is in contradistinction to ordinary semi-conductors, such as selenium wherein this amplification mechanism is absent. Electrical energy is consequently released, in donor type semi-conductors, in the form of current in the crystal that is many times the energy applied to the crystal by the exciting ray; and such amplified current may be employed in many different ways to indicate or detect and measure the intensity of exciting rays impinging on the crystalline material. In screens of the sort herein contemplated, each minute zone of a layer 12 thus comprises a crystal fragment which provides a tiny amplifier capable of delivering a substantial quantity of electrical current proportional to the intensity of the impinging rays.

In order to employ the layers 12 for X-ray measuring or detecting purposes, the same may be formed on one side thereof in intimate electrical contact with a sheet or film of electrical conducting material 13, and for some purposes, at least, the surface of the layer 12, which faces away from the sheet 13, may carry a film or sheet of electrical conducting material 13', such as molybdenum, silver, aluminum or other metal, applied as by flashing, spraying or sputtering procedures in intimate superficial electrical contact with the layer 12.

The crystalline material, of which the layer 12 is constituted, is in finely divided condition, the same being pulverized to produce the crystal material in granular form of desired fineness. To this end, the material may be comminuted substantially to a powdery or dust-like condition comprising tiny granular crystal fragments 12'. The pulverized material may then be mixed with a suitable liquid carrier and binder, such as lacquer, care being taken to thin the carrier to free flowing condition so that the mixture may be applied as a thin film on a suitable support plate or panel 14.

Figure 2:
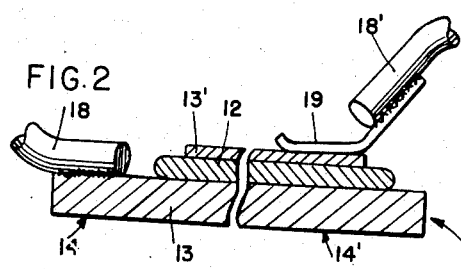
Figs. 2, 3, 4 and 5 are sectional views illustrating detector elements embodying the present invention.
Figure 3:
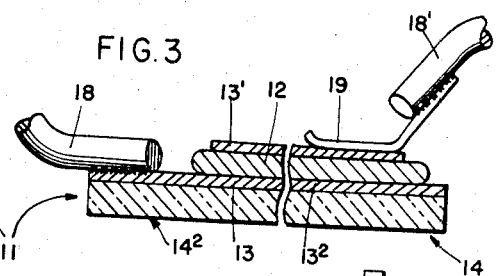
Figure 4:
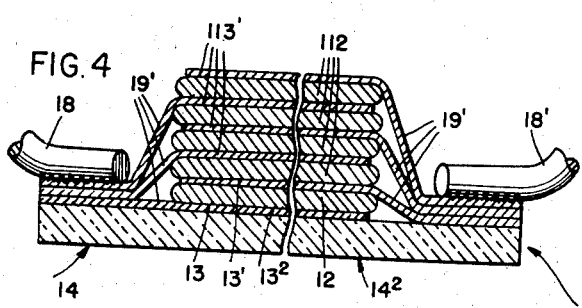
Figure 5:
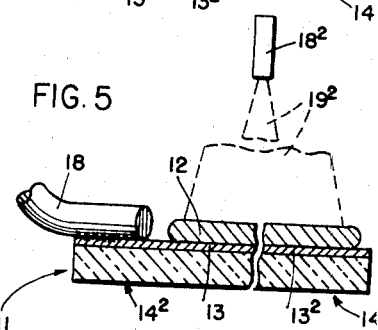
Figure 6:
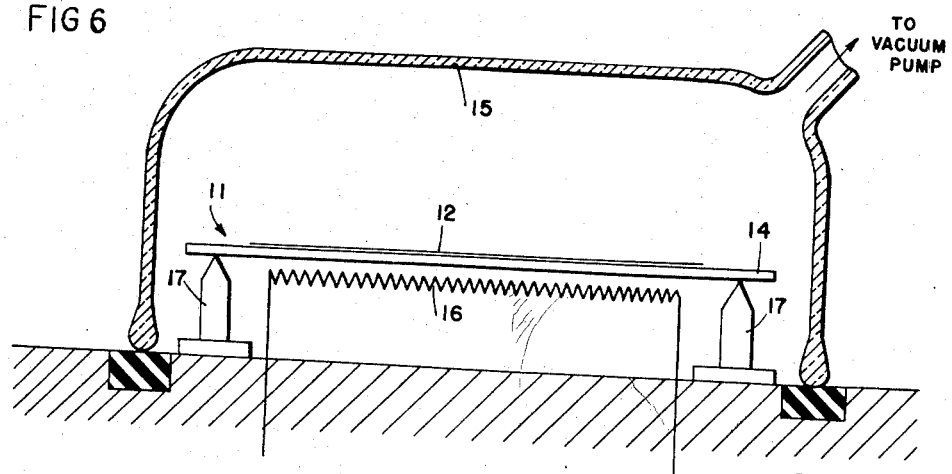
Fig. 6 is a sectional view illustrating apparatus employed in the fabrication of X-ray sensitive elements in accordance with the present invention.

The panel 14, as shown in Fig. 2, may comprise a plate 14' of electrical conducting material, such as metal, in which case the metal plate may form the electrical conducting layer 13 in the finished product. Alternately, as shown in Figs. 3 and 4, the panel 14 may comprise a sheet or plate $14^2$ of electrically non-conducting material, such as quartz or silica glass, having a layer or film $13^2$ of electrical conducting material, such as molybdenum, silver, aluminum or other metal, applied upon a surface of the plate $14^2$, as by flashing, spraying or sputtering procedures. In such case, the layer of conducting material $13^2$ thus applied on the non-conducting backing plate $14^2$ may form the conducting layer 13 in the finished product.

Lacquer, as a carrier and binder containing the comminuted crystalline material in suspension therein, may be applied as a thin layer upon the backing member 14, as by painting the same upon a surface of the metal plate 14' or upon the conducting layer $13^2$ on the backing plate $14^2$ of non-conducting material. The painted film may then be permitted to dry out in situ by exposure to air at normal atmospheric temperature, such drying being continued over a period of the order of thirty-six hours. If desired, an additional layer of lacquer, carrying comminuted crystalline material, may be applied over the previously applied layer and allowed to dry in order to build up the crystalline material on the backing plate to desired thickness.

The so-coated backing plate may then be placed in a vacuum chamber, such as a bell jar 15, containing a heater 16, such as a tungsten filament, or filaments. The coated backing plate 14 is preferably supported within the vacuum chamber 15, upon suitable pedestals 17, with the coated surface of the plate facing upwardly in the vacuum chamber, the heating means 16 being disposed beneath the so supported plate. Means may be provided to regulate the heating effect of the heating means in order to heat the plate and the coated layer thereon sufficiently to cause visible boiling of the remaining evaporable components of the binder in the coated layer. The application of heat to the coated plate 14 should be continued until visible boiling of the binder ceases, after which heating of the plate may be discontinued and the plate allowed to cool in the vacuum chamber. Under normal conditions, the coated plate should be heated during a period of the order of five minutes, after which the plate should be allowed to cool in the vacuum chamber during a cooling period of the order of three hours. The resulting layer of crystalline material may have a thickness of the order of 0.015 inch or less, although layers of greater thickness may be accomplished by successively applying and drying, one upon the other, several coatings of binder carrying comminuted crystalline material. Layers or films of crystalline material thus produced are strongly adherent upon the backing plate 14 and can be removed therefrom only by use of a sharp edged scraping tool.

As shown more especially in Figs. 2 and 3, the element 11, comprising the layer 12 and the conductive films or layers 13 and 13', may be employed for X-ray detection purposes by electrically connecting the layer 12 in a measuring circuit of the sort disclosed in the aforesaid copending applications for U. S. Letters Patent. Such connection may be accomplished by means of conductors 18 and 18', one of which may be electrically connected with the layer 13, the other conductor being connected with the layer 13', as by means of a contact element 19 electrically connected with the conductor and adapted to make electrical contact with the layer 13' at any convenient location, as at an edge of the panel element 11.

As shown in Fig. 4 of the drawings, the panel element, in addition to the layer 12 and conducting sheets 13 and 13', may include an additional layer or layers 112 and 113', each superposed upon the other and all applied upon the conducting sheet 13' of the initial layer 12. These additional layers may be formed on the panel mounted layers 12 and 13' by repeating the above described layer and film applying procedures as often as necessary to build up a detection unit embodying the desired number of additional layers 112 and 113'. Each of the layers 13, 13' and 113' of such a layered or laminated unit may be provided with electrical connection extensions 19', which extensions may be electrically connected with conductors 18 and 18' for the electrical connection of the unit in a measuring circuit; and it should be noted that the conducting sheets 13, 13' and 113' of the stack may be alternately connected with the conductors 18 and 18', whereby the stacked layers 12 and 112 are, in effect, interconnected electrically in relative parallel relationship between the conductors 18 and 18'.

It should be understood that, for some purposes, in single layer screens of the sort shown in Figs. 2 and 3, the conducting film or layer 13' may be omitted, and ray induced changes in the impedance of the constituent crystals of the layer 12 determined by scanning the surface of the layer 12 with an electronic scanning beam $19^2$, such as may be produced and controlled by and emitted from an electron gun $18^2$. In such case the scanning beam and its emitting gun may form conductor means for successively connecting each integral scanned portion of the layer in the translation circuit employed to measure the response of the screen to the rays impinging thereon.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein being preferred embodiments for the purpose of illustrating the invention.

The invention is hereby claimed as follows:

1. A sensitive panel element comprising a layer of crystalline semi-conductor material in finely comminuted condition applied in a carrier binder and baked on and in intimate electrical contact with a sheet of electrical conducting material throughout the surface area of the layer.

2. A sensitive panel element comprising a plate of electrical conducting metal, and a layer of crystalline semi-conductor material in finely comminuted condition applied in lacquer as a binder and baked in vacuo on and in intimate electrical contact with said plate throughout the surface area of the layer.

3. A sensitive panel element comprising a layer of crystalline semi-conductor material in finely comminuted condition on and in intimate electrical contact with a sheet of electrical conducting material throughout the surface area of the layer on one side thereof, means to electrically connect said sheet of conducting material in an external translation system, and means connected in said system for scanning said layer with an electron beam.

4. A sensitive panel element comprising layers of crystalline semi-conductor material superposed in finely comminuted condition, said layers forming a laminated stack, sheets of electrical conducting material disposed each between and in intimate electrical contact with the facing surfaces of adjacent layers of the stack substantially throughout the area thereof, and a sheet of electrical conducting material on and forming intimate electrical contact with each of the outwardly facing surfaces of the outermost layers of said stack.

5. A sensitive panel element comprising layers of crystalline semi-conductor material superposed in finely comminuted condition, said layers forming a laminated stack, sheets of electrical conducting material disposed each between and in intimate electrical contact with the facing surfaces of adjacent layers of the stack substantially throughout the area thereof, a sheet of electrical conducting material on and forming intimate electrical contact with each of the outwardly facing surfaces of the outermost layers of said stack, and means for electrically interconnecting said sheets of conducting material in an external measuring circuit.

6. A sensitive panel element comprising layers of crystalline semi-conductor material superposed in finely comminuted condition, said layers forming a laminated stack, sheets of electrical conducting material disposed each between and in intimate electrical contact with the facing surfaces of adjacent layers of the stack substantially throughout the area thereof, a sheet of electrical conducting material on and forming intimate electrical contact with each of the outwardly facing surfaces of the outermost layers of said stack, and means for electrically interconnecting the alternate sheets of conducting material in said stack.

7. A sensitive panel element comprising layers of crystalline X-ray sensitive, electron donor semi-conductor material superposed in finely comminuted condition, said layers forming a laminated stack, sheets of electrical conducting material disposed each between and in intimate electrical contact with the facing surfaces of adjacent layers of the stack substantially throughout the area thereof, a sheet of electrical conducting material on and forming intimate electrical contact with each of the outwardly facing surfaces of the outermost layers of said stack, and means for electrically interconnecting the alternate sheets of conducting material in said stack.

8. A sensitive panel element comprising layers of crystalline X-ray sensitive, electron donor semi-conductor material superposed in finely comminuted condition, said layers forming a laminated stack, sheets of electrical conducting material disposed each between and in intimate electrical contact with the facing surfaces of adjacent layers of the stack substantially throughout the area thereof, and a sheet of electrical conducting material on and forming intimate electrical contact with each of the outwardly facing surfaces of the outermost layers of said stack.

9. A sensitive panel element comprising a layer of crystalline X-ray sensitive, electron donor semi-conductor material in finely comminuted condition on and in intimate electrical contact with a sheet of electrical conducting material throughout the surface area of the layer on one side thereof, means to electrically connect said sheet of conducting material in an external translation system, and means connected in said system for scanning said layer with an electron beam.

References Cited in the file of this patent

UNITED STATES PATENTS

| | | |
|---|---|---|
| 1,772,743 | Barringer | Aug. 12, 1930 |
| 1,790,850 | Thirring | Feb. 3, 1931 |
| 1,932,699 | Klas | Oct. 31, 1933 |
| 2,248,985 | Gray | July 15, 1941 |
| 2,290,186 | Homan et al. | July 21, 1942 |
| 2,556,991 | Teal | June 12, 1951 |
| 2,654,853 | Weimer | Oct. 6, 1953 |
| 2,747,104 | J. E. Jacobs | May 22, 1956 |

OTHER REFERENCES

Frerichs: "On the Conductivity Produced in CdS Crystals by Irradiation with Gamma-Rays," Physical Review, vol. 76, No. 12, December 15, 1949, pages 1869–1875.

Jacobs: "Electrical Conductivity of Cadmium Sulphide Exposed to Pulsating X Radiation," Electrical Engineering, August 1951, pages 667 to 671.